(12) United States Patent
Coleman et al.

(10) Patent No.: US 10,414,339 B2
(45) Date of Patent: Sep. 17, 2019

(54) METHOD FOR OPERATING A CAMERA SYSTEM, CAMERA SYSTEM AND MOTOR VEHICLE

(71) Applicant: Connaught Electronics Ltd., Tuam, County Galway (IE)

(72) Inventors: Martin Oliver Coleman, Roscam (IE); Arthur Asodisen, Tuam (IE); Paul Burke, Kilcolgan (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 159 days.

(21) Appl. No.: 15/524,806

(22) PCT Filed: Nov. 4, 2015

(86) PCT No.: PCT/EP2015/075739
§ 371 (c)(1),
(2) Date: May 5, 2017

(87) PCT Pub. No.: WO2016/071412
PCT Pub. Date: May 12, 2016

(65) Prior Publication Data
US 2018/0304809 A1    Oct. 25, 2018

(30) Foreign Application Priority Data
Nov. 7, 2014 (DE) .......................... 10 2014 116 285

(51) Int. Cl.
*B60R 1/00* (2006.01)
*H04N 7/18* (2006.01)

(52) U.S. Cl.
CPC ............... *B60R 1/00* (2013.01); *H04N 7/181* (2013.01); *B60R 2300/408* (2013.01); *B60R 2300/70* (2013.01); *B60R 2300/802* (2013.01)

(58) Field of Classification Search
CPC ............... B60R 1/00; B60R 2300/802; B60R 2300/408; B60R 2300/70; H04N 7/181
See application file for complete search history.

(56) References Cited

U.S. PATENT DOCUMENTS 7,855,755 B2 * 12/2010 Weller ....................... B60R 1/12
349/11
2005/0030379 A1    2/2005 Luskin et al.
(Continued)

FOREIGN PATENT DOCUMENTS

DE    10 2012 025 322 B4    8/2014

OTHER PUBLICATIONS

International Search Report issued in PCT/EP2015/075739 dated Feb. 11, 2016 (2 pages).
(Continued)

*Primary Examiner* — Russell Frejd
(74) *Attorney, Agent, or Firm* — Osha Liang LLP

(57) ABSTRACT

The invention relates to a method for operating a camera system (2) of a motor vehicle (1), in which a first camera (3, 5, 6) captures a first environmental region (14, 16, 17) of the motor vehicle (1), and a second camera (4) captures a second environmental region (15) extending behind the motor vehicle (1), wherein the cameras (3, 4, 5, 6) are electrically connected to a control unit (7) and are controlled by the control unit (7), and the control unit (7) is connected to a communication bus (28) of the motor vehicle (1), wherein upon an interruption of a communication connection (27) between the communication bus (28) and the control unit (7), a rearview image at least partially including the second environmental region (15) is displayed on a display device (18) of the motor vehicle (1) by the control unit (7).

11 Claims, 2 Drawing Sheets

(56) References Cited

U.S. PATENT DOCUMENTS

Figure 1:
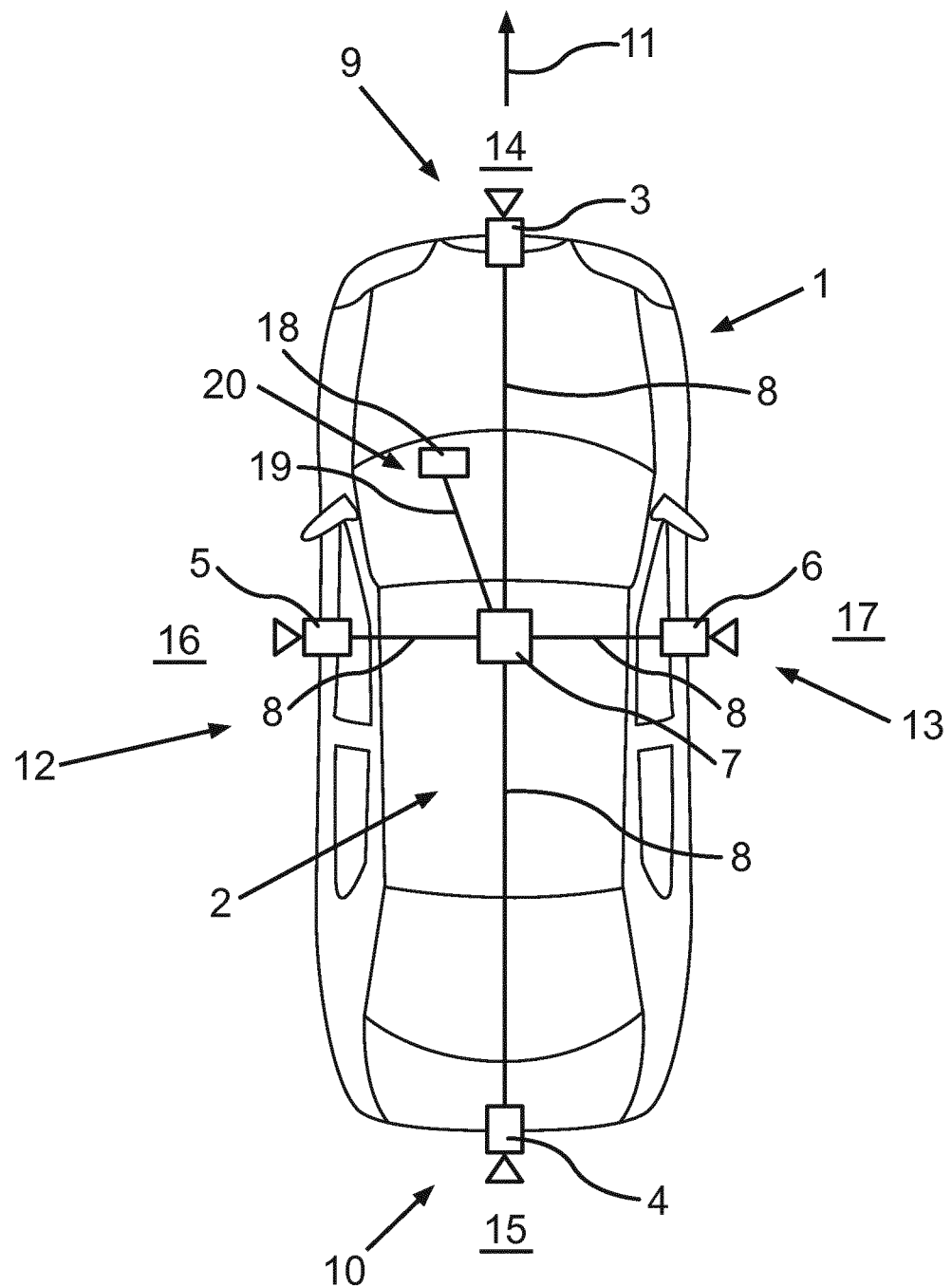

| | | |
|---|---|---|
| 2009/0231432 A1 | 9/2009 | Grigsy et al. |
| 2014/0218529 A1* | 8/2014 | Mahmoud .............. H04N 7/181 |
| | | 348/148 |
| 2014/0300740 A1* | 10/2014 | Fujioka ................. H04N 7/183 |
| | | 348/148 |
| 2015/0035977 A1* | 2/2015 | Schrepfer ................ H04N 5/44 |
| | | 348/143 |
| 2017/0015246 A1* | 1/2017 | Honghalli Devaraju .................... |
| | | G06F 9/4401 |

OTHER PUBLICATIONS

Written Opinion of the International Searching Authority issued in PCT/EP2015/075739 dated Feb. 11, 2016 (5 pages).
German Search Report issued in DE 10 2014 116 285.4 dated Aug. 19, 2015 (7 pages).

* cited by examiner

METHOD FOR OPERATING A CAMERA SYSTEM, CAMERA SYSTEM AND MOTOR VEHICLE

The invention relates to a method for operating a camera system of a motor vehicle. A first camera captures a first environmental region of the motor vehicle, and a second camera captures a second environmental region extending behind the motor vehicle. The cameras are electrically connected to a control unit and are controlled by the control unit. The control unit is connected to a communication bus of the motor vehicle. In addition, the invention relates to a camera system for a motor vehicle as well as to a motor vehicle with a camera system.

Methods for operating a camera system of a motor vehicle are known from the prior art. Thus, for example, in an environment vision system, multiple cameras capturing an environmental region of the motor vehicle are connected to the same control unit. A video signal is output by the control unit, for example for a display device of the motor vehicle. The output video signal is presently only provided by a selected camera. The selection of the camera, from which the video signal is output, is made depending on a communication bus connected to the control unit. Thus, the control unit obtains a control command via the communication bus, by which the camera is determined, from which the video signal is to be displayed on the display device.

Presently, the interest is directed to the case that a communication connection between the communication bus and the control unit is interrupted. The control unit then does not obtain a control command and does not know which camera is to be selected for the video output signal for display on the display device. Known solutions are that the image of the camera is displayed on the display device, which has been displayed before the interruption of the communication connection, or none of the cameras is selected for the video output signal and thus an image is not displayed on the display device.

It is disadvantageous in the previous prior art that an image matching the current operating situation of the motor vehicle thus cannot be provided and safety criteria with respect to the monitoring of the environmental region either are not taken into account.

It is an object of the invention to provide a method, a camera system as well as a motor vehicle, by which or in which a presentation of the environmental region is effected upon the interruption of the communication connection between a control unit and a communication bus, which offers high safety information adapted to situation.

According to the invention, this object is solved by a method, by a camera system as well as by a motor vehicle having the features according to the respective independent claims.

In a method according to the invention, a camera system of a motor vehicle is operated. In the camera system, a first camera captures a first environmental region, and a second camera captures a second environmental region extending behind the motor vehicle. The cameras are electrically connected to a control unit and are controlled by the control unit. The control unit is connected to a communication bus of the motor vehicle. According to the invention, it is provided that upon an interruption of the communication connection between the communication bus and the control unit, in particular only a rearview image at least partially capturing the second environmental region is displayed on a display device of the motor vehicle by the control unit.

By the method according to the invention, it becomes possible that the motor vehicle can also be safely operated if the camera system is operable only to a limited extent and does not have the full functionality.

Thus, by the method according to the invention, it is provided that if the control unit does not obtain a control command via the communication bus, which indicates, which camera is to be selected, to output the video signal from it and for example display it on the display device, the video signal of that camera is output, which captures the second environmental region extending behind the motor vehicle. Behind the motor vehicle means that the second environmental region is passed in the reversing operation of the motor vehicle. In the reversing operation, thus if a reverse gear of the motor vehicle is engaged, a travel tube of the motor vehicle is in the second environmental region. A driver of the motor vehicle sits in the motor vehicle substantially oriented forwards and cannot immediately see the second environmental region, thus without the light from the second environmental region, which impinges the eyes of the driver, having to be redirected or having to be electronically captured. The light can for example be redirected via mirrors. The displaying or providing the rearview image of the second environmental region on the display device is thus particularly helpful for the driver because the second environmental region can be poorly seen. The safe operation of the motor vehicle is therefore increased if the second environmental region is displayed on the display device upon the interruption of the communication connection.

Preferably, it is provided that after an interruption, it is in particular examined by the control unit at least in discrete time intervals if the communication connection between the control unit and the communication bus again exists or is reestablished. Thus, while the rearview image is displayed on the display device, it can be examined at least in discrete time intervals if the communication connection is reestablished and the control unit thus again receives a current control command. Based on the current control command, the control unit again knows, which camera is to be selected for the output of the video signal and display on the display device. The examination at least in discrete time intervals allows fast switching back into a normal operating mode, in which the control unit obtains the control command for selecting the respective camera from the communication bus.

Furthermore, it is preferably provided that in particular a section of the rearview image is determined by the control unit and the section is displayed on the display device if the communication connection is interrupted. Thus, according to this embodiment, it is provided that not the entire rearview image is displayed on the display device, but the section of the rearview image. The display of the section on the display device has the advantage that particularly confusing areas in the second environmental region can be particularly clearly displayed on the display device. Thus, the section with its dimensions can for example already be stored in the control unit in pre-configured manner. If the communication connection is then interrupted, thus, it is switched to the rearview image, and the dimensions of the section can be immediately applied to the rearview image.

Furthermore, it is preferably provided that in particular the section is determined with a predetermined scaling of the rearview image by the control unit and the section is displayed on the display device if the communication connection is interrupted. By the predetermined scaling of the section, a partial area of the second environmental region can also be particularly clearly displayed on the display device. Thus, a certain area of the second environmental region can for example be presented in enlarged manner in order to afford a particularly good insight into this area or partial area there. By the scaling of the section, however, it can for example also be zoomed out and thus a particularly large area of the second partial area can be displayed on the display device. Thereby, a particularly high clarity can be achieved. Furthermore, the selection of the section and/or the scaling of the section can depend on a travel speed of the motor vehicle and/or a steering angle of the motor vehicle and thus a predicted travel tube of the motor vehicle. Thus, in slow parking maneuvers for example a smaller section can be selected, which displays the respective area of the second environmental region larger, and in faster driving than the parking maneuver, for example, a larger area of the second environmental region can be provided with the section. Thus, a good adjustability of the camera system for various operating situations of the motor vehicle and thus in turn a particularly high safety of the motor vehicle is advantageous.

Preferably, it is provided that after reestablished communication connection between the control unit and the communication bus, a basic mode operation is performed, in which it is determined by the communication bus if an image of the first environmental region or the rearview image is displayed on the display device. The basic mode operation or a normal operating mode can be performed after reestablished communication connection in order to for example display the image of that camera to the driver on the display device, which currently is selected by the communication bus by control command. The basic mode operation is therefore the mode, which is provided if the communication connection between the control unit and the communication bus is intact and thus not interrupted and the camera system is fully functional. Thus, it is advantageous that now all of the cameras can again be used and the images thereof can be displayed on the display device depending on operating situation.

In a further embodiment, it can be provided that the rearview image is displayed on the display device after a predetermined period of time after the interruption. Thus, it can be that after the interruption of the communication connection between the control unit and the communication bus has been determined, the predetermined period of time is awaited before the rearview image is displayed on the display device. The predetermined period of time has the advantage that thereby, for example with very short interruptions of the communication connection, flickering or fast toggling of the display device from an image of the first environmental region to the rearview image is prevented. The flickering of the display device can for example be disturbing and/or irritating to the driver of the motor vehicle during driving. Similarly, the predetermined period of time can be utilized before it is switched into the basic mode operation after reestablished communication connection.

Furthermore, it is preferably provided that the communication bus is provided as a CAN bus. The CAN (Controller Area Network) bus is a serial bus system and belongs to the field busses. It is advantageous that the CAN bus is particularly widespread in context of the motor vehicle.

The invention also relates to a camera system with an environment vision system, which includes a first camera and at least a second camera, which captures an environmental region extending behind a motor vehicle, and a control unit, wherein the control unit is connected to a communication bus of the motor vehicle, and the camera system is adapted to perform a method according to the invention.

In a further embodiment, it is preferably provided that the first camera captures a front environmental region, and the environment vision system additionally includes a third camera, which captures a left lateral environmental region of the motor vehicle viewed in forward direction of travel of the motor vehicle, and/or a fourth camera, which captures a right lateral environmental region of the motor vehicle viewed in forward direction of travel of the motor vehicle. Thus, it is advantageous that the entire environment of the motor vehicle can be captured by the environment vision system. Thereby, particularly high safety for the motor vehicle can be provided. Obstacles and/or dangers for the motor vehicle can be recognized or captured in the environment or in the entire environmental region. The more cameras are connected to the control unit, the more advantageous it is if the control unit knows, from which camera the video output signal is to be provided.

A motor vehicle according to the invention, in particular a passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Below, embodiments of the invention are explained in more detail based on schematic drawings.

Figure 2:
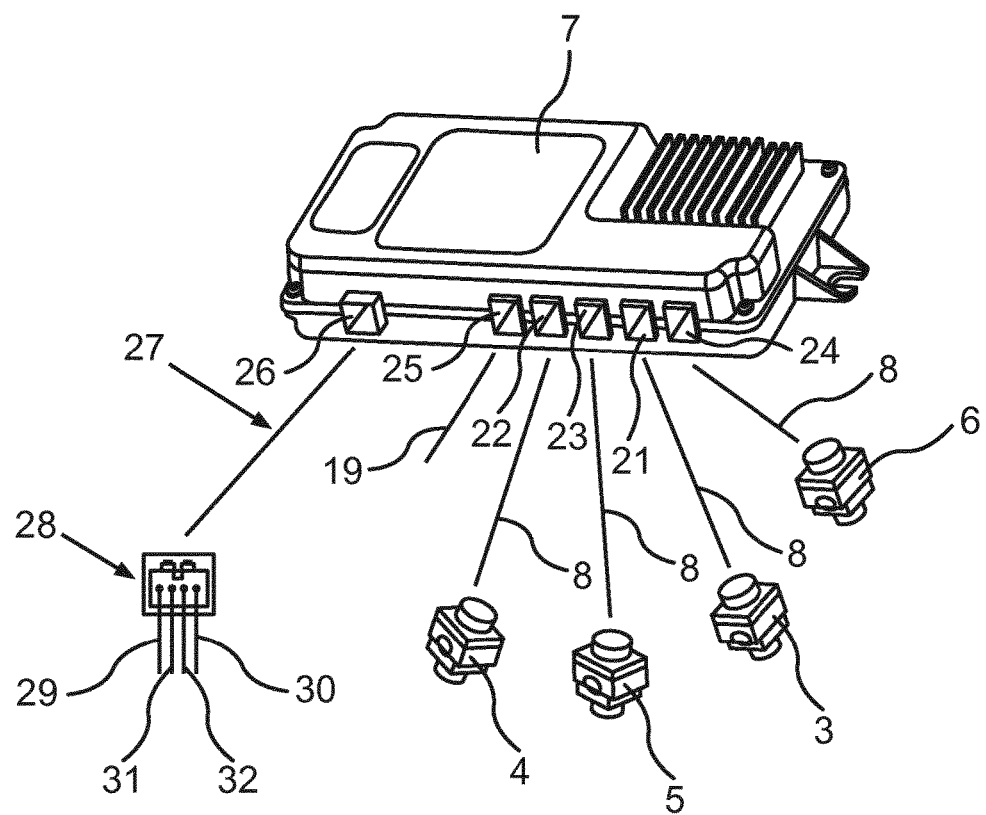

There show:

FIG. 1 in schematic plan view an embodiment of a motor vehicle according to the invention with a camera system; and FIG. 2 a schematic illustration of a control unit of the motor vehicle.

In FIG. 1, a plan view of a motor vehicle 1 with a camera system 2 according to an embodiment of the invention is schematically illustrated. In the embodiment, the camera system 2 includes a first camera 3, a second camera 4, a third camera 5, a fourth camera 6 and a control unit 7. The cameras 3, 4, 5, 6 are each connected to the control unit 7 via an electrical camera connection 8. The number and the position of the cameras 3, 4, 5, 6 are only to be understood exemplarily and not conclusively.

According to the embodiment in FIG. 1, the first camera 3 is disposed on a front 9 of the motor vehicle 1. The second camera 4 is disposed on a rear 10 of the motor vehicle. The third camera 5 is disposed on a left side 12 of the motor vehicle 1 viewed in forward direction of travel 11 of the motor vehicle 1. The fourth camera 6 is disposed on a right side of the motor vehicle 1 with respect to the forward direction of travel 11. However, the arrangement of the cameras 3, 4, 5, 6 is variously possible, however preferably such that an environment of the motor vehicle 1 around the motor vehicle 1 can be completely captured.

According to the embodiment, the camera system 2 is an environment vision system. The first camera 3 captures a first environmental region 14, which extends in front of the motor vehicle 1 according to the embodiment. The second camera 4 captures a second environmental region 15, which extends behind the motor vehicle 1, and thereby provides a rearview image. Thus, behind the motor vehicle 1 means behind the rear 10 of the motor vehicle 1. The third camera 5 captures a left lateral environmental region 16 of the motor vehicle 1. The fourth camera 6 captures a right lateral environmental region 17 of the motor vehicle 1. The environment includes all of the environmental regions 14, 15, 16, 17.

The cameras 3, 4, 5, 6 can be CMOS (complementary metal-oxide-semiconductor) cameras or else CCD (charged-coupled device) cameras or any image capturing devices, which are able to provide an image of the environmental regions 14, 15, 16, 17 of the motor vehicle 1. The cameras 3, 4, 5, 6 are video cameras, which continuously provide an image sequence of images. The respective images are frames. The image sequence of the images is then processed for example in real time.

The motor vehicle 1 further includes a display device 18. The display device 18 can for example be a display with a liquid crystal display (LCD), however, any display devices are possible, on which an image of the cameras 3, 4, 5, 6 can be displayed. The display device 18 is connected to the control unit 7 by an electrical video connection 19 according to the embodiment. The arrangement of the display device 18 is in a cockpit 20 of the motor vehicle 1 according to the embodiment. However, the arrangement of the display device 18 is variously possible within or outside of the motor vehicle 1. The display device 18 can for example also be a head-up display (HUD).

FIG. 2 shows the control unit 7. According to the embodiment, the control unit 7 has a first camera terminal 21 for the first camera 3. The control unit 7 has a second camera terminal 22 for the second camera 4. The control unit 7 has a third camera terminal 23 for the third camera 5, and furthermore, the control unit 7 has a fourth camera terminal 24 for the fourth camera 6. In addition, the control unit 7 has a video output 25, which serves for connecting the display device 18 to the control unit 7 via the electrical video connection 19. Thus, the corresponding video signal of the respective camera 3, 4, 5, 6 is provided to the display device 18 via the video output 25. The camera terminals 21, 22, 23, 24 of the control unit 7 are substantially signal inputs, while the video output 25 is substantially a signal output.

In addition, the control unit 7 has a communication bus terminal 26. Via the communication bus terminal 26, a communication connection 27 to a communication bus 28 of the motor vehicle 1 is established. The communication bus 28 is a CAN bus according to the embodiment. According to the embodiment, the communication bus 28 has a current supply 29 as well as a ground 30. Furthermore, the communication bus 28 has a first CAN line 31 and a second CAN line 32 to transmit information such as for example a control signal for the control unit 7.

As just mentioned, the control unit 7 obtains the control signal via the communication connection 27, and based on the control signal, it is determined, which of the cameras 3, 4, 5, 6 provides the video signal for the video output 25.

Thus, it is for example selected the respective camera 3, 4, 5, 6 depending on the operating situation of the motor vehicle 1 to output or display an image, which the selected camera 3, 4, 5, 6 has captured, on the display device 18. The image is, as already mentioned, in particular a component of an image sequence or an image succession. Thus, if the communication connection 27 is now interrupted for example due to electromagnetic interferences acting on the communication bus 28, thus, the control unit 7 does not obtain a control signal, which informs the control unit 7, which camera 3, 4, 5, 6 is to be selected for the display on the display device 18. The interruption of the communication connection 27 can for example also be effected by a bulk current injection (BCI) from an external source into the communication bus 28.

Upon the interruption of the communication connection 27 between the communication bus 27 and the control unit 7, thus, it is switched to the second camera 4. Thus, the video signal of the second camera 4 is output to the video output 25. The switching to the video signal of the second camera 4 is effected by the control unit 7 according to the embodiment. By switching from a camera 3, 5, 6 different from the second camera 4 to the video output signal of the second camera 4, the rearview image, in particular an image of the second environmental region 14, is displayed to a driver of the motor vehicle 1 on the display device 18. If the rearview image has already been displayed on the display device 18 before the interruption of the communication connection 27, thus, the rearview image is also maintained upon the interruption of the communication connection 27 and further displayed on the display device 18. With the image or the rearview image of the second environmental region 15, the driver can monitor the current situation in the environmental region behind the motor vehicle 1. Thus, during the restricted operation of the camera system 2, for the entire period of time, only the environmental region captured by the second camera 4 is displayed. Thus, generally, only a rearview image is displayed for the entire period of time in the error mode of the camera system 2.

Thus, also in reversing, if the communication connection 27 is interrupted, the driver can see or monitor the second environmental region 15 for example during a parking maneuver and thus for example recognize a person, in particular a child, and/or an obstacle. The safety of the motor vehicle 1 is thereby increased.

In case the communication connection 27 is reestablished after an interruption, thus, it is switched into a basic mode operation, in which it is again determined by the communication bus 28, which of the cameras 3, 4, 5, 6 is switched to the video output 25 or which image of the respective camera 3, 4, 5, 6 is displayed on the display device 18.

The invention claimed is:

1. A method for operating a camera system of a motor vehicle, comprising:
    capturing, by a first camera, a first environmental region of the motor vehicle;
    capturing, by a second camera, a second environmental region extending behind the motor vehicle, wherein the first and second cameras are electrically connected to a control unit and are controlled by the control unit, and the control unit is connected to a communication bus of the motor vehicle; and
    upon an interruption of a communication connection between the communication bus and the control unit, displaying a rearview image at least partially including the second environmental region on a display device of the motor vehicle by the control unit.

2. The method according to claim 1, wherein after an interruption it is examined at least in discrete time intervals if the communication connection between the control unit and the communication bus again exists.

3. The method according to claim 1, wherein a section of the rearview image is determined, and the section is displayed on the display device, if the communication connection is interrupted.

4. The method according to claim 3, wherein the section is determined with a predetermined scaling of the rearview image, and the section is displayed on the display device if the communication connection is interrupted.

5. The method according to claim 1, further comprising:
after reestablished communication connection between the control unit and the communication bus, performing a basic mode operation, in which a determination is made by the communication bus if an image of the first environmental region or the rearview image is displayed on the display device.

6. The method according to claim 1, wherein the rearview image is displayed on the display device after a predetermined period of time after the interruption.

7. The method according to claim 1, wherein the communication bus is provided as a CAN bus.

8. A camera system with an environment vision system, comprising:
a first camera and at least a second camera, which captures an environmental region extending behind a motor vehicle; and
a control unit connected to a communication bus of the motor vehicle, wherein the camera system is configured to perform a method according to claim 1.

9. The camera system according to claim 8, wherein the first camera captures a front environmental region, and the environment vision system additionally comprises a third camera, which captures a left lateral environmental region of the motor vehicle viewed in forward direction of travel of the motor vehicle, and a fourth camera, which captures a right lateral environmental region of the motor vehicle viewed in forward direction of travel of the motor vehicle.

10. A motor vehicle with a camera system according to claim 8.

11. The method according to claim 1, wherein the interruption of the communication connection between the communication bus and the control unit is due to electromagnetic interferences acting on the communication bus.

* * * * *